(12) United States Patent
Avrahami (10) Patent No.: US 9,250,779 B2
(45) Date of Patent: Feb. 2, 2016

(54) SYSTEM AND METHOD FOR CONTENT CREATION

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/832,310

(22) Filed: Mar. 15, 2013

(65) Prior Publication Data

US 2014/0282009 A1    Sep. 18, 2014

(51) Int. Cl.
*G06F 3/00*   (2006.01)
*G06F 3/0484*  (2013.01)

(52) U.S. Cl.
CPC .................................. *G06F 3/04845* (2013.01)

(58) Field of Classification Search
CPC ............................. G06F 3/0481; G06F 17/241
USPC ........................................................ 715/730
See application file for complete search history.

(56) References Cited

U.S. PATENT DOCUMENTS

| 2007/0064121 | A1 | 3/2007 | Issa et al. |
| 2008/0215984 | A1 | 9/2008 | Manico et al. |
| 2008/0304808 | A1 | 12/2008 | Newell et al. |
| 2009/0116752 | A1 | 5/2009 | Isomura et al. |
| 2010/0259544 | A1* | 10/2010 | Chen et al. .................... 345/441 |
| 2012/0106859 | A1* | 5/2012 | Cheatle ......................... 382/225 |
| 2012/0294514 | A1 | 11/2012 | Saunders et al. |
| 2013/0208994 | A1* | 8/2013 | Shirata .......................... 382/254 |

OTHER PUBLICATIONS

International Search Report and Written Opinion received for PCT Patent Application No. PCT/US2014/019281, mailed on Jun. 20, 2014, 11 pages.
Secord, et al., "Creating Collections with Automatic Suggestions and Example-Based Refinement", UIST 10, Oct. 3-6, 2010, New York New York.
International Preliminary Report on Patentability received for PCT Patent Application No. PCT/US2014/019281, issued Sep. 15, 2015.

* cited by examiner

*Primary Examiner* — Angie Badawi
(74) *Attorney, Agent, or Firm* — Grossman, Tucker, Perreault & Pfleger, PLLC (57) ABSTRACT

A system and method for content creation based on a mixed-initiative approach includes an interface configured to allow a user to access and interact with a generation module to assist in the creation of a media project based on media from a media database. The generation module is configured to receive user-selected media and retrieve a set of related media and populate and organize the media project with the user-selected media and related media. For example, in the case of a photo book project, the generation module is configured to automatically identify a set of images associated with a user-selected image and populate a corresponding page of the photo book with the user-selected image and set of associated images in a corresponding layout, having the user-selected image most prominently depicted. The generation module provides the user with a preview of a generated page for evaluation and manual user editing.

8 Claims, 6 Drawing Sheets

SYSTEM AND METHOD FOR CONTENT CREATION

FIELD

The present disclosure relates to the presentation of media, and, more particularly, to a system and method for content creation based on a mixed-initiative approach.

BACKGROUND

With ongoing advances in technology, digital media has become the dominant and preferred form of media. Accordingly, personal media libraries are increasingly becoming a major part of daily life for many individuals. Many users amass music, photos, and videos in digital form for use on their electronic devices, such as smartphones, computers, and personal media players. One common user task is collecting items from such personal media libraries for a specific purpose. For example, users may desire to curate and share photographs with friends, family, and colleagues. In another example, users may compose video-clips and photographs into a video presentation.

There currently exist software applications that allow a user to edit and organize one or more images into an organized format for presentation. For example, some applications allow a user to create slideshows, albums or photo books from digital images from the user's personal media library.

Some applications assist the user in the manual creation of digital slideshows, albums or photo books. Generally, these applications provide the user with a straightforward means of accomplishing the basic task of image organization and slide/page layout. For example, a user may be able to manually configure most, if not all, aspects of the slideshow or photo book, such as selecting suitable images, selecting the desired layout and theme for each slide/page, selecting specific images for each slide/page, adding text within any desired slide/page and rearrange the images and text within each slide or page. Although these applications allow a user to create and configure a slideshow or photo book to their exact specifications, manual creation of the slideshow or photo book may be difficult and may generally require a large amount of user time and interaction. Therefore, the task is less likely to be completed due to the significant amount of time and effort required to accomplish it.

Some applications offer automated functions for assisting the user in the creation of slideshows or photo books with minimal input from the user. Some automated applications still allow a user to manually select images to include in certain slides/pages and annotate the images by entering text, or other data, describing the images. Furthermore, some automated applications may only require a user to select a collection from which desired images are to be retrieved, and the application will automatically select and format images to include in the slideshow or photo book. One common approach to automated layout is the use of templates. In this approach, predefined layouts with empty areas are filled in with user images. Thus, the size, placement, rotation, and framing of the images on the page are predetermined. A user merely needs to specify which images should be placed in which empty area to complete a slide/page. Templates may provide a straightforward and working solution to the layout problem. However, this solution is somewhat limiting as the choice of layouts is bounded by the collection of available templates. Generally, variation in page layout design can only be achieved by the addition of new templates.

Although automated applications generally provide a simplified means of creating a slideshow or photo book with minimal input from the user, automated applications have some associated drawbacks. For example, one challenge in automated generation of slide/page layouts is allowing a level of creativity in the layouts produced. In particular, automated applications are limited in that such applications do not allow user input during creation of certain aspects of the slideshow or photo book, thus resulting in a slideshow or photo book that fails to meet a user's desired configuration or design and may further require user editing. Additionally, automated creation of slideshows and photo books may not provide users with a sense of accomplishment based on the fact that the slideshow or photo book is not tailored to the user's desired configuration and layout.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system and method for content creation based on a mixed-initiative approach. The system and method described herein are directed to content creation, particularly to the creation of a media project based on digital media, such as, for example, a slideshow, album, photo book, or the like. It should be noted, however, that a system and method consistent with the present disclosure is not limited to the creation of image-based media projects. In particular, a system and method consistent with the present disclosure may be configured to create other types of media projects, such as, for example, a video presentation.

The content creation system is configured to provide a user of a client device with a means of generating a media project from one or more media elements. The content creation system includes an interface configured to allow the user to access and interact with a generation module to assist in the creation of the media project. The generation module is configured to generate one or more portions of the media project from one or more media elements stored in a media database of the client device. For example, in a photo book, the generation module is configured to generate one or more pages of the photo book from images in the media database. The generation module is configured to provide the user with a plurality of different layouts for each page of the photo book. Each layout may have a different associated design, including, but not limited to, the number of images, the arrangement of the images, the size of each image, the orientation of each image, special effects for each image and any inclusion of text or graphics on the page.

A user may manually select the desired number of pages, as well as one of a plurality of layouts for each page of the photo book. The user may further manually select at least one image from the media database that the user desires to be included and most prominently displayed in each page. Upon receiving a user selection, including the user-selected image, the generation module is configured to process the user-selected image and determine one or more attributes associated with the selected image. The image attributes may include, for example, colors, shapes and textures of one or more objects in the selected image, one or more persons in the selected image, as well as metadata, such as keywords, tags, date and time and descriptions associated with the selected image.

The generation module is further configured to automatically search the media database and identify a set of one or more images associated with the user-selected image based, at least in part, on the user-selected image attributes. The set of identified images may generally have attributes that have a strong correlation with the attributes of the user-selected image. The generation module is further configured to automatically populate and arrange the page with the user-selected image and the set of identified associated images in a corresponding layout. The generation module is further configured to provide the user with a preview of a generated page for evaluation, upon which the user may accept the generated page as is, or manually edit the page to their exact configuration prior to final generation of the page.

A system consistent with the present disclosure is based on a mixed-initiative approach that lies between manual and automated content creation of a media project. The mixed-initiative approach provides a user with the ease and simplicity of automated creation while allowing a user to guide and have some control over the creation process. Accordingly, the system provides the advantages associated with both manual and automated creation of media projects with little or none of the drawbacks. Accordingly, the system allows the user to guide the automated creation process and provides opportunities for the user to provide input when the user desires.

Figure 1:
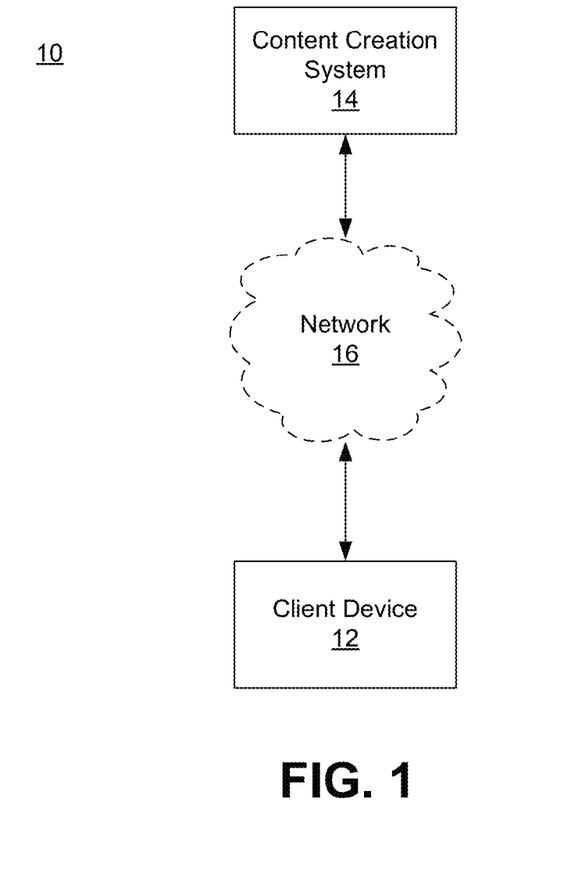
FIG. 1 is a block diagram illustrating one embodiment of a system for content creation consistent with the present disclosure.

Turning to FIG. 1, one embodiment of a system 10 consistent with the present disclosure is generally illustrated. The system 10 includes a client device 12 and a content creation system 14. As described in greater detail herein, the content creation system 14 is generally configured to provide a user of the client device 12 with content creation services, including a means for creating a media project from the user's digital media. The following description refers to the creation of an image-based media project such as, for example, a slideshow, album, photo-book, or the like. It should be noted, however, that a system consistent with the present disclosure is may be configured to create other types of media projects, such as, for example, a video presentation.

As shown, the client device 12 and content creation system 14 may be configured to communicate with one another via a network 16. Accordingly, the content creation system 14 may be an internet-based service configured to provide a user of the client device 12 with content creation services. The network 16 may be any network that carries data. Non-limiting examples of suitable networks that may be used as network 16 include the internet, private networks, virtual private networks (VPN), public switch telephone networks (PSTN), integrated services digital networks (ISDN), digital subscriber link networks (DSL), wireless data networks (e.g., cellular phone networks), other networks capable of carrying data, and combinations thereof. In some embodiments, network 16 is chosen from the internet, at least one wireless network, at least one cellular telephone network, and combinations thereof.

As generally understood, the client device 12 may include, but is not limited to, a personal computer (PC) (e.g. desktop or notebook computer), tablet computer, netbook computer, a television, video monitor, electronic billboard, smart phone, portable video game device, portable digital assistant (PDA), portable media player (PMP), e-book, mobile internet device, personal navigation device, and other computing device.

Figure 2:
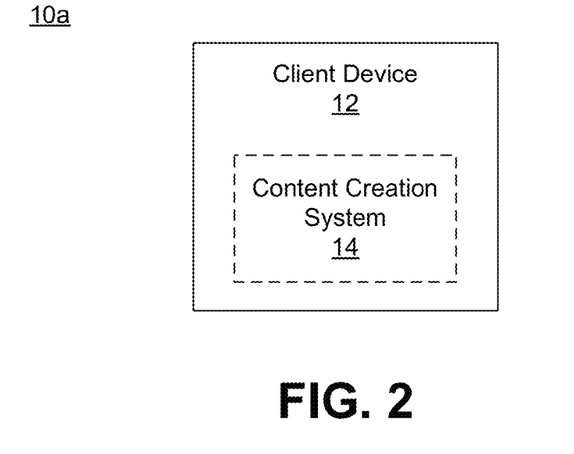
FIG. 2 is a block diagram illustrating another embodiment of a system for content creation consistent with the present disclosure.

In the illustrated embodiment, the client device 12 and content creation system 14 are separate from one another. It should be noted that in other embodiments, as generally understood by one skilled in the art, the client device 12 may optionally include the content creation system 14, as shown in FIG. 2, for example. The optional inclusion of the content creation system 14 as part of the client device 12, rather than an element external to client device 12, is denoted in FIG. 2 with broken lines.

Figure 3:
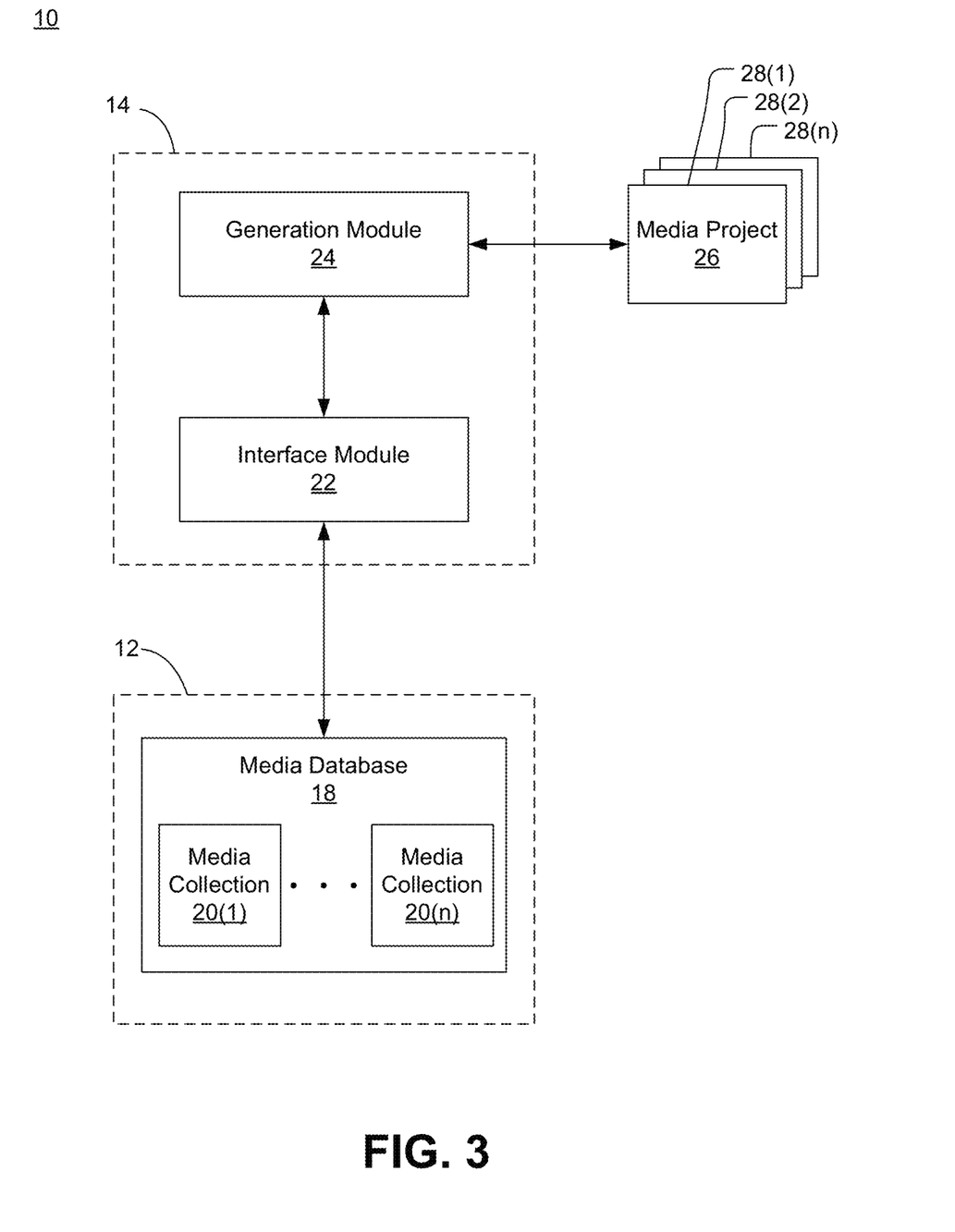
FIG. 3 is a block diagram illustrating the system of FIG. 1 in greater detail.

Turning now to FIG. 3, the system of FIG. 1 is illustrated in greater detail. As shown, the client device 12 may include a media database 18 having one or more media collections 20(1)-20(n) stored within. As generally understood, each media collection 20(1)-20(n) may include a different set of associated media files stored within. For example, media collection 20(1) may include images related to a specific event, such as, for example, images of the user's family vacation, while media collection 20(2) may include images of a wedding that the user attended. As such, each media collection 20 may be organized such that each collection includes a different set of associated images. It should be noted, however, that the media collections 20(1)-20(n) may include related images amongst one another, including duplicates.

As generally understood, the term "image" may encompass a much broader scope than the conventional photograph. For example, images may include digital images, computer generated graphics, bitmaps, photographs, computer altered photographs, video still frames, scanned images, various forms or artwork, text, background materials, as well as video clips, animation, and computer generated time variant materials.

Figure 5:
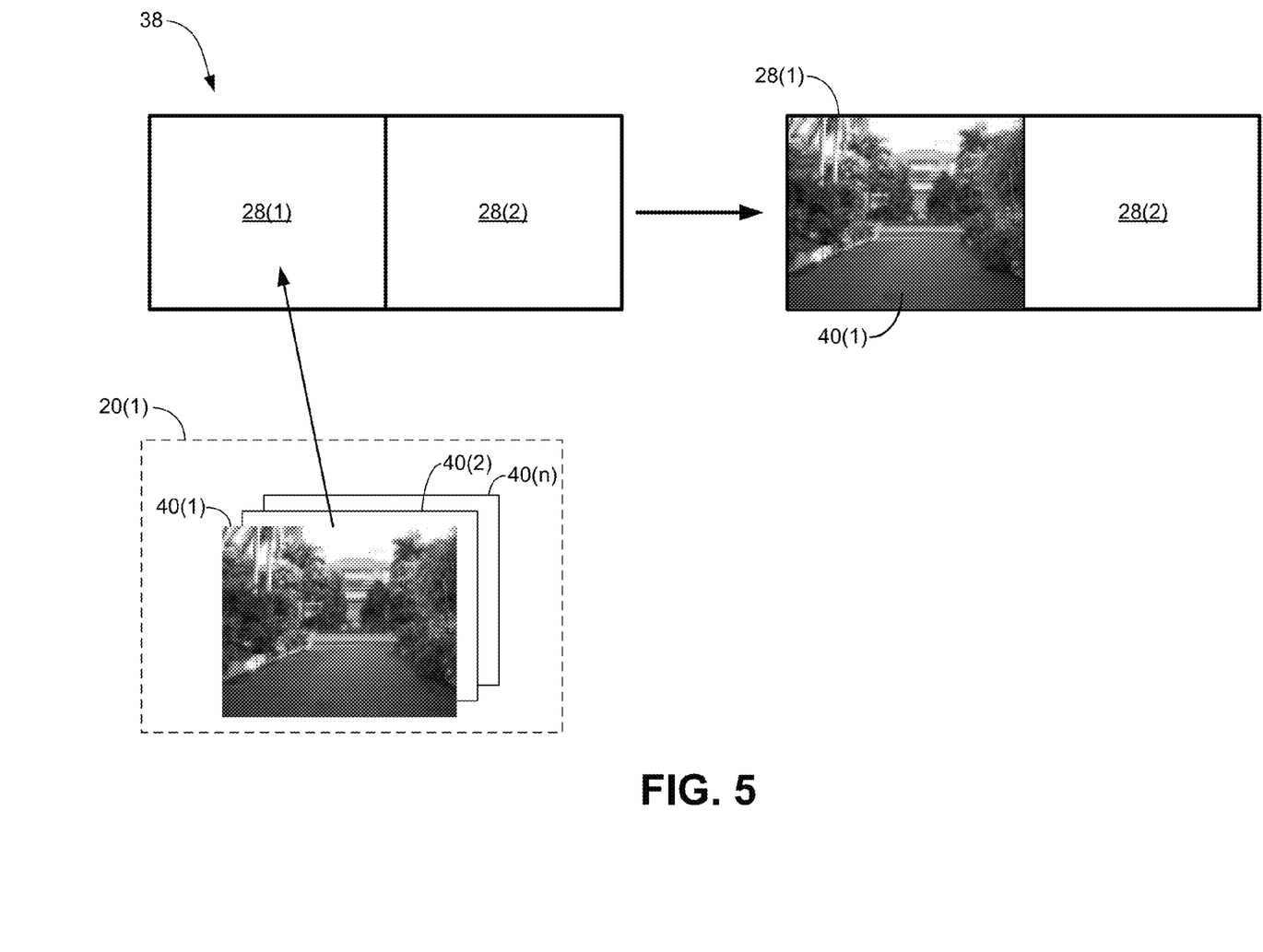
FIGS. 5 and 6 depict screenshots of an interface as displayed on a client device during user interaction with the media content creation system consistent with various embodiments of the present disclosure.
Figure 6:
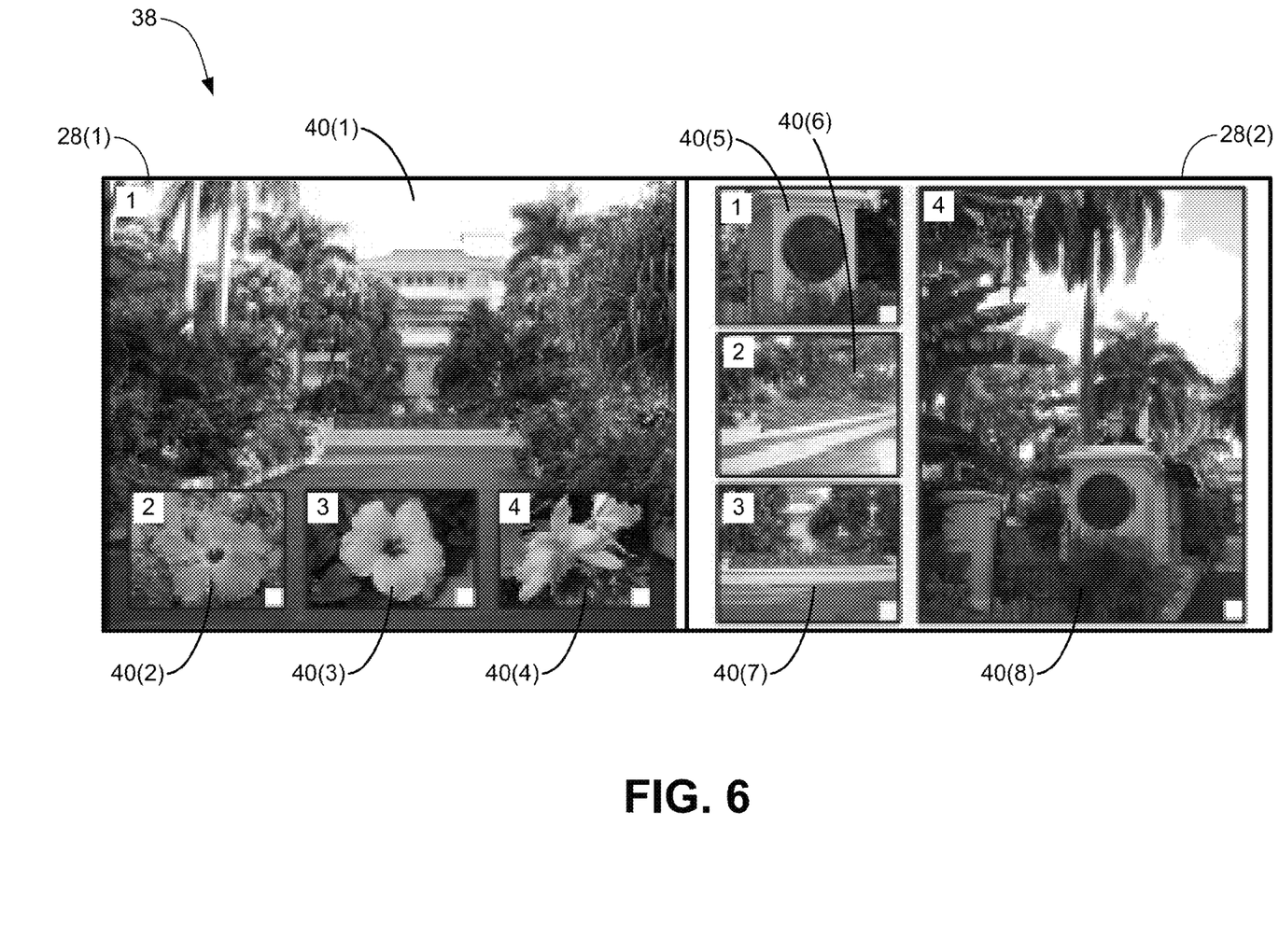

The content creation system 14 is configured to provide the user of the client device 12 with a means of generating a media project 26 from media stored within the media database 18. As shown, the content creation system 14 includes an interface 22 configured to allow the user to access and interact with a generation module 24 to assist in the creation of the media project 26. The interface 22 is configured to provide the user with a variety of tools and options for guiding the process of creating the media project 26, as shown in FIGS. 5 and 6, for example. As generally understood, the user may interact with the generation module 24 by way of the interface 22 on a display of the client device 12, for example.

For ease of description, the following embodiments are described in reference to the creation of a photo book 26. However, it should be noted that the content creation system 14 consistent with the present disclosure may be configured to create other media projects, including, but not limited to, slideshows, posters, calendars, video presentations, and the like. As described in greater detail herein, the generation module 24 is configured to generate a photo book 26 having one or more pages 28(1)-28(n), each page 28 having one or more images from the media database 18 based on a mixed-initiative approach, generally requiring minimal input from the user while providing the user with control over the generation process.

Figure 4:
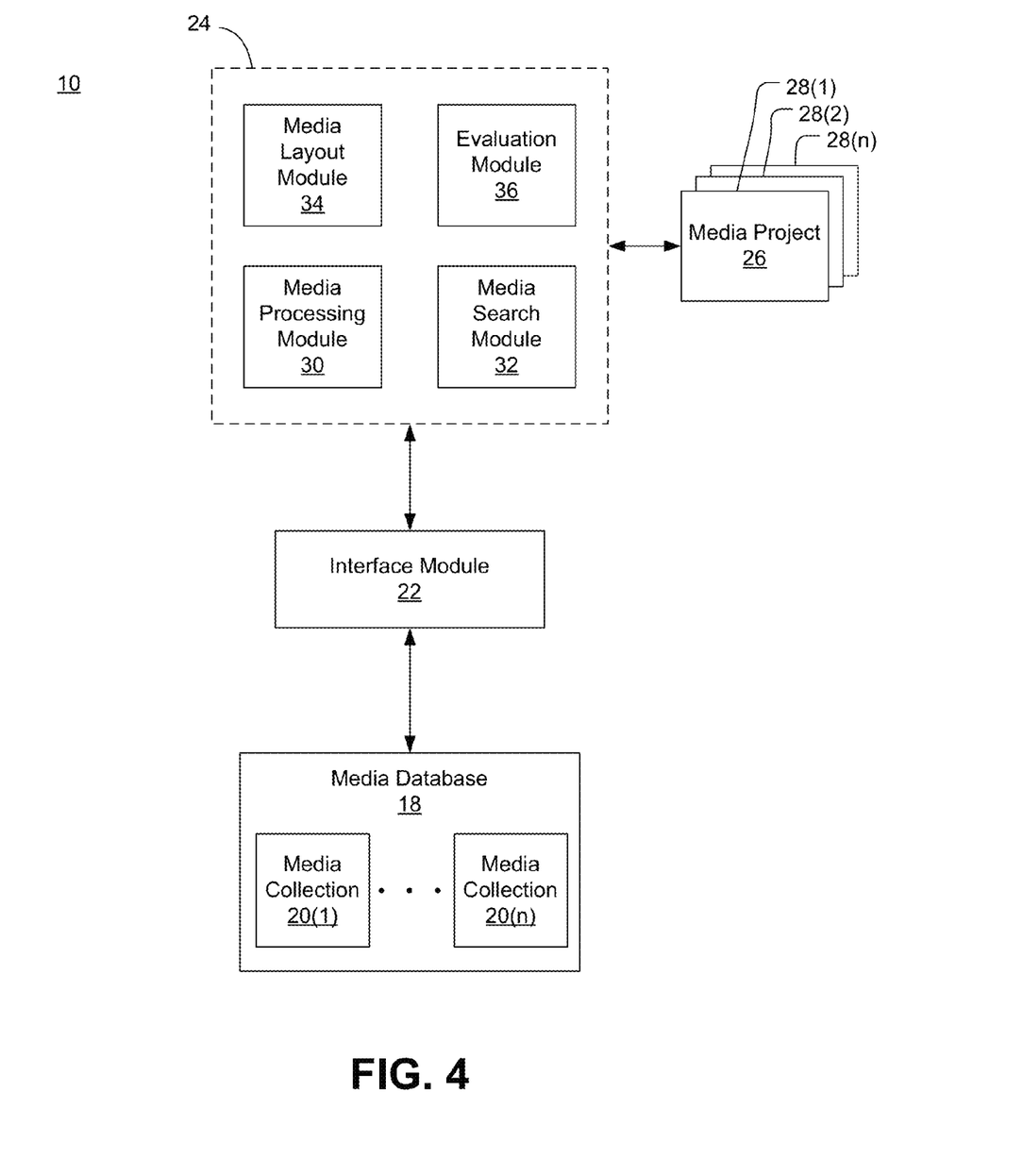
FIG. 4 is a block diagram illustrating one embodiment of a content generation module consistent with the present disclosure.

Turning to FIG. 4, a block diagram illustrating one embodiment of a generation module 24 consistent with the present disclosure is illustrated. The generation module 24 is configured to allow the user to manually select the desired number of pages of the photo book 26, as well as one of a plurality of different layouts for each page. As shown, the generation module 24 includes a media processing module 30, a media search module 32, a media layout module 34 and an evaluation module 36. It should be noted that, although illustrated as separate from one another, the media processing module 30, media search module 32, media layout module 34 and evaluation module 36 may be incorporated into one module or multiple modules or combinations of modules and may be executed on distributed processors.

To begin the process of creating the photo book 26, the user may manually select at least one image from the media database 18 that the user desires to be included and most prominently displayed for each page of the photo book 26. The media processing module 30 is configured to receive the user-selected image and process the user-selected image and determine one or more attributes associated with the selected image. The image attributes may include, for example, colors, shapes and textures of one or more objects in the selected image, one or more persons in the selected image, as well as metadata, such as keywords, tags, date and time and descriptions associated with the selected image.

For example, the media processing module 30 may include custom, proprietary, known and/or after-developed object and color recognition code (or instruction sets), hardware, and/or firmware that are generally well-defined and operable to receive an image and identify, at least to a certain extent, one or more objects in the image and color values of each object, as well as one or more persons in the image. Additionally, the media processing module 30 may include custom, proprietary, known and/or after-developed code (or instruction sets), hardware, and/or firmware that are generally well-defined and operable to receive an image and identify, at least to a certain extent, metadata for the image.

The media search module 32 is configured to receive data related to the user-selected image attributes and automatically search the media database 18 to identify a set of one or more images associated with the user-selected image based, at least in part, on the user-selected image attributes. In particular, the media search module 32 may be configured to search the media database 18 for images that are similar to the user-selected image, such that similar images may complement the user-selected image and match the subject matter of the user-selected image. The media search module 32 may include similar properties as the media processing module 30 in that the media search module 32 is configured to process images and identify attributes for each image. Each of the identified images may generally have attributes that have a strong correlation with the attributes of the user-selected image.

The media search module 32 may be configured to identify a set of one or more images associated with the user-selected image based on a comparison of the user-selected image attributes with attributes of other images in the media database 18. In particular, the media search module 32 may be configured to compare the user-selected image attributes with attributes for one or more images in the media database 18. The comparison may be based on similarity or matching techniques. Such similarity or matching techniques may include, for example, content-based image retrieval (CBIR), which uses computer vision techniques to determine similarity between images, concept-based image indexing (CBII), which uses semantic knowledge from meta-tags to establish similarity, or a combination of both CBIR and CBII.

In one embodiment, the media search module 32 may be configured to first search the media collection 20 (such as, for example, media collection 20(1)) from which the user-selected image was stored, and, after searching for associated images in the corresponding media collection 20, the media search module 32 may then search other media collections 20 (e.g. media collections 20(2)-20(n)) within the media database 18. By first searching the media collection 20 corresponding to the user-selected image, the media search module 32 is more likely to identify images having greater correlation with the user-selected image than other images stored in other media collections 20. As previously described, each media collection 20(1)-20(n) may include a set of images associated with one another, such as a set of images of a family vacation stored in media collection 20(1) and a set of images of a friend's wedding in media collection 20(2). As such, if the user-selected image depicts a hotel that the user stayed at when on a family vacation, then the media search module 32 will likely identify images from the media collection 20(1) that have greater correlation with the user-selected image (i.e. image of hotel) than images from other media collections, such as media collection 20(2) of the friend's wedding. In other embodiments, the media search module 32 may be configured to search the entire media database 20, searching each media collection 22 in no particular order.

The media layout module 34 is configured to receive and analyze sets of identified images associated with each user-selected image for each page. Upon analyzing a set of identified images, the media layout module 34 is configured to populate and arrange a page with the corresponding user-selected image and one or more images from the set of identified associated images. The media layout module 34 is configured to arrange a page in one of a plurality of different layouts, wherein each layout may have a different associated design, including, but not limited to, the number of image areas, the arrangement of the image areas, the size of each image area, the orientation of each image area, special effects for each image area and any inclusion of text or graphics on the page or for each image area.

The media layout module 34 may be configured to select only mutually exclusive images for incorporation into pages of the photo book so as to prevent any duplicated images from being presented. For example, a user may wish to create a photo book with three pages. As such, the user may manually select a different image to be included in each page, thus selecting three images, one user-selected image per page. During processing, the media search module 32 is configured to identify a set of associated images for each of the three user-selected images to be incorporated into each corresponding page. The media layout module 34 is configured to review each of the sets of identified associated images and identify any images that are included in more than one of the sets of images (i.e. duplicated images). In particular, the media layout module 34 may be configured to compare each of the sets of images with one another to identify any duplicated images. The media layout module 34 may include any known similarity or matching techniques. In the event that the media layout module 34 identifies an image that is included in more than one of the sets of identified images (e.g. a duplicate image), the media layout module 34 is configured to incorporate the duplicate image in only one of the pages and further remove the duplicate image from the other sets of images. The media layout module 34 may then transmit a request to the media search module 32 to provide substitute images from the media database 18 to replace the removed duplicate image from the sets of images.

Additionally, the media layout module 34 is further configured to automatically determine a layout for each page based, at least in part, on the number of identified associated images with the corresponding user-selected image. For example, the media search module 32 may identify only three images associated with a first user-selected image on a first page and six images associated with a second user-selected image on a second page. The media layout module 34 may be configured to automatically adjust the layout of the first and second pages so as to best fit the user-selected images and associated images, while still prominently displaying the user-selected images. Accordingly, the first and second pages will likely have different layouts based on the total number of images to be presented on each page.

In some embodiments, upon analyzing a set of identified images associated with a user-selected image, the media layout module 34 may be configured to select a particular combination or subset of the images to include within the user-selected image on the page so as to produce a more varied and interesting presentation. For example, the user may select to generate a page having a total of six images (including the user-selected image). The media layout module 34 may be configured to analyze an initial set of identified images from the media search module 32, wherein the set may initially include eight images that are associated with the user-selected image. The media layout module 34 may be configured to analyze the initial set of eight associated images and generate a subset of images having a low inter-correlation with one another. For example, although each of the eight images from the initial set are identified as being associated with the user-selected image (i.e. share similar attributes with the user-selected image), each of the eight images may be more or less similar to one another. The media layout module 34 is configured to identify a subset of images having the least amount in common with one another in accordance with the total number of images selected by the user to be included on the page. As such, the media layout module 34 may be configured to identify five of the eight images of the initial set that are least like one another and populate the corresponding page with the user-selected image and the subset of five images having a low inter-correlation with one another, thereby providing a page with a more varied set of six images.

The media layout module 34 may be configured to populate and arrange a page with a user-selected image and identified associated images based, at least in part, on one of the attributes of the images. For example, the images can be sorted based on metadata, such as image capture times. In one implementation, the list of sorted images can be sequenced chronically based on capture time of the images, such that the images may appear in the photo book 26 in chronological order. The images can also be sorted based on capture locations, identified objects and colors, and combinations thereof. Accordingly, the media layout module 34 may be configured to allow the user to manually select the particular theme of each page, wherein the user may wish to have a page focus on presenting images showing the same people, the same location, the same time, etc.

Furthermore, the media layout module 34 may further include text fields for each page layout. The text may include, for example, image caption associated with each image on the page, as well as a general caption on the page. The media layout module 34 may allow a user to manually input text for a desired image or area of the page. Additionally, the media layout module 34 may be configured to include text based on data related to each image, such as metadata for each image, including a description associated the image.

The evaluation module 36 is configured to provide the user with a preview of generated pages for evaluation by the user. The user may be provided with tools and options for changing one or more aspects of the page, including, but not limited to, removing one or more of the associated images, selecting additional images to include in the page, editing the size, orientation and placement of each image, editing, deleting or adding text fields, changing the background of the page, etc. Upon evaluating and, in some cases, editing the pages, the generation module 24 is configured to produce the photo book 26.

In the event that the user selects an additional image to include in any given page, the media search module 32 is configured to perform search for one or more images associated with the additional user-selected image based on methods and techniques described above. In turn, the media layout module 34 will rearrange the page based on the second user-selected image and any associated images for evaluation by the user.

Turning now to FIGS. 5 and 6, screenshots of an interface 38 provided by the interface module 22 as displayed on a client device 12 during user interaction with the media content creation system 14 are illustrated. As shown in FIG. 5, a user is presented with a spread of the photo book 26 consisting of at least a first page 28(1) and a second page 28(2). The user may select an image to have displayed on each of the first and second pages 28(1)-28(2). As shown, the user selects an image 40(1) from a media collection 20(1) onto the first page 28(1).

In FIG. 6, the user is then presented with a generated spread of the first and second pages 28(1)-28(2) for evaluation. As shown, user-selected image 40(1) and images 40(2)-40(4) identified as being associated with the user-selected image 40(1) are included on the first page 28(1) in an associated layout. The page layout of the first page 28(1) includes 4 image areas (labeled 1-4), wherein image area 1, in which the user-selected image 40(1) is positioned, is the largest and most prominently displayed, while image areas 2-4 are smaller and less prominent. The second page 28(2) also includes images 40(5)-40(8) identified as being associated with the user-selected image 40(1). As shown, the interface 38 may allow the user to select one or more of the associated images 40(2)-40(8) to keep or remove from either of the first and second pages 28(1)-28(2). Additionally, the user may drag an additional image to the second page 28(2), for example, to create a completely different themed second page 28(2). Once the user is satisfied with the first and second pages 28(1)-28(2), as well as any other additional pages of the photo book 26, a finalized copy of the photo book 26 may be saved, wherein the content creation system may render a finished media product for sharing, printing, etc.

Figure 7:
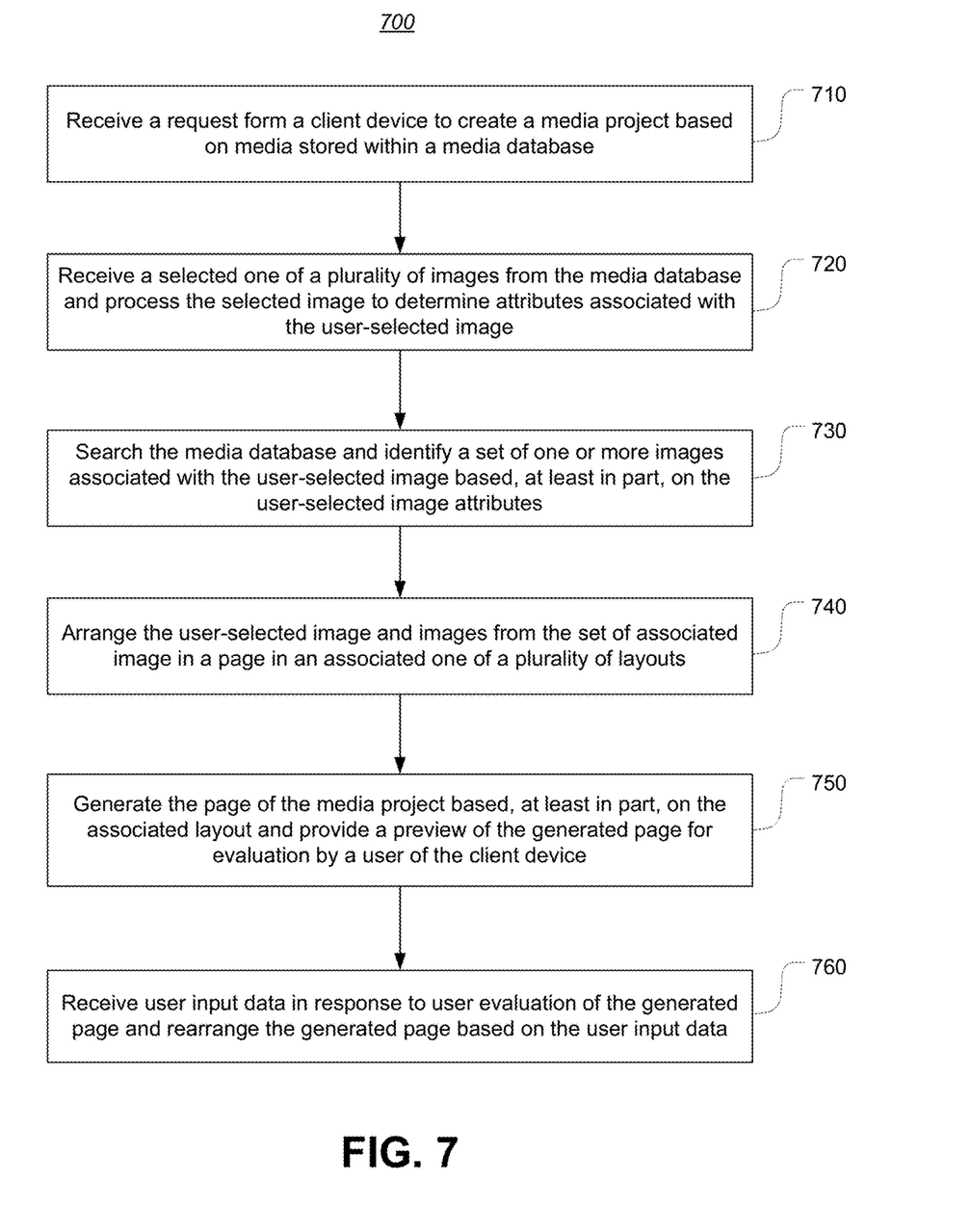
FIG. 7 is a flow diagram illustrating one embodiment for content creation consistent with present disclosure.

Turning now to FIG. 7, a flowchart of one embodiment of a method 700 for content creation consistent with the present disclosure is illustrated. The method 700 includes receiving a request from a client device to create a media project based on media stored within a media database (operation 710). The media project may include, for example, a slideshow or photo book created from one or more images stored within the media database of the client device. The method further includes receiving a selected one of a plurality of images from the media database and processing the user-selected image and determining one or more attributes associated with the user-selected image (operation 720). The user of the client device may wish to create at least one page of a photo book for example, based on the selected image, wherein the user-selected image will be the most prominent image on the page. The image attributes may include, for example, colors, shapes and textures of one or more objects in the selected image, one or more persons in the selected image, as well as metadata, such as keywords, tags, date and time and descriptions associated with the selected image.

The method further includes searching the media database and identifying a set of one or more images associated with the user-selected image based, at least in part, on the attributes of the user-selected image (operation 730). The identified one or more images may generally have attributes that have a strong correlation with the attributes of the selected image. The method further includes arranging the user-selected image and one or more images from the set of identified associated images in a page in an associated one of a plurality of layouts for the page (operation 740). The method further includes generating the page of the media project based on the associated layout and providing a preview of the generated page for evaluation by the user of the client device (operation 750). The method further includes receiving user input data and rearranging the layout of the generated page based, at least in part, on the user input data (operation 760). During evaluation, the user may accept the generated slide/page as is, or manually edit the page to their exact configuration prior to final generation of the page.

While FIG. 7 illustrates method operations according various embodiments, it is to be understood that in any embodiment not all of these operations are necessary. Indeed, it is fully contemplated herein that in other embodiments of the present disclosure, the operations depicted in FIG. 7 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The following examples pertain to further embodiments. In one example there is provided an apparatus for creating a media project. The apparatus may include a generation module configured to communicate with a client device and generate a media project based on media stored within the client device. The generation module may include a media processing module configured to process one or more user-selected media elements from a plurality of media elements in the media database and identify one or more attributes associated with each user-selected media element. The generation module may further include a media search module configured to search the media database and identify a set of one or more media elements associated with each user-selected media element based, at least in part, on attributes of each user-selected media element. The generation module may further include a media layout module configured to generate a portion of the media project for each user selected media element and corresponding set of identified associated media elements arranged in an associated one of a plurality of layouts. The generation module may further include an evaluation module configured to provide a preview of each generated portion of the media project to the client device for evaluation by a user of the client device.

The above example apparatus may be further configured, wherein the generation module is configured to receive user input data based on user evaluation of the generated portions of the media project and the media layout module is configured to rearrange the layout of each generated portion based, at least in part, on the user input data.

The above example apparatus may be further configured, wherein the generation module is configured to generate a media project in a selected format including a slideshow, album, photo book and video presentation format, the selected format being dependent upon a user selection. In this configuration, the example apparatus may be further configured, wherein the media elements are image-based elements and the portions of the media project are pages of a photo book or slides of a slideshow.

The above example apparatus may be further configured, alone or in combination with the above further configurations, wherein the one or more attributes are selected from the group consisting of shapes and textures of one or more objects in the user-selected media element, one or more persons in the user-selected media element, metadata, including keywords, tags, date and time and descriptions, associated with the user-selected media element.

The above example apparatus may be further configured, alone or in combination with the above further configurations, wherein the media search module is configured to compare attributes of one or more media elements from the media database with attributes of each user-selected media element and identify media elements associated with each user-selected media element based on the comparisons. In this configuration, the example apparatus may be further configured, wherein the comparisons are based on similarity or matching techniques selected from the group consisting of content-based image retrieval (CBIR), concept-based image indexing (CBII) and a combination of both CBIR and CBII.

The above example apparatus may be further configured, alone or in combination with the above further configurations, wherein the media layout module is configured to analyze each set of identified associated media elements for each user-selected media element and identify duplicate media elements included in more than one set of identified associated media elements. In this configuration, the example apparatus may be further configured, wherein the media layout module is configured to incorporate any identified duplicate media element in only one of the portions of the media project.

The above example apparatus may be further configured, alone or in combination with the above further configurations, wherein the media layout module is configured to analyze each set of identified associated media elements for each user-selected media element and further establish a subset of associated media elements having a low inter-correlation with one another.

In another example there is provided a method for creating a media project. The method may include receiving a request from a user of a client device to create a media project based on media stored within a media database, receiving one or more user-selected media elements from the media database and processing each user-selected media element and identifying one or more attributes associated with each user-selected media element, searching the media database and identifying a set of one or more media elements associated with each user-selected media element based, at least in part, on attributes of each user-selected media element, generating a portion of the media project for each user-selected media element and one or more media elements from a corresponding set of identified associated media elements arranged in an associated one of a plurality of layouts and providing a preview of each generated portion of the media project for evaluation by the user of the client device.

The above example method may further include receiving user input data and rearranging the layout of the generated portion based, at least in part, on the user input data.

The above example method may be further configured, alone or in combination with the above further configurations, wherein the identifying a set of one or more media elements associated with each user-selected media element includes comparing attributes of one or more media elements from the media database with attributes of each user-selected media element and identifying media elements associated with each user-selected media element based on the comparisons.

The above example method may further include, alone or in combination with the above further configurations, analyzing each set of identified associated media elements for each user-selected media element, identifying duplicate media elements included in more than one set of identified associated media elements and incorporating any identified duplicate media element in only one of the portions of the media project.

The above example method may further include, alone or in combination with the above further configurations, analyzing each set of identified associated media elements for each user-selected media element and establishing a subset of associated media elements having a low inter-correlation with one another.

In another example, there is provided at least one computer accessible medium storing instructions which, when executed by a machine, cause the machine to perform the operations of any of the above example methods.

In another example, there is provided a system arranged to perform any of the above example methods.

In another example, there is provided a system for creating a media project. The system may include means for receiving a request from a user of a client device to create a media project based on media stored within a media database, means for receiving one or more user-selected media elements from the media database and processing each user-selected media element and identifying one or more attributes associated with each user-selected media element, means for searching the media database and identifying a set of one or more media elements associated with each user-selected media element based, at least in part, on attributes of each user-selected media element, means for generating a portion of the media project for each user-selected media element and one or more media elements from a corresponding set of identified associated media elements arranged in an associated one of a plurality of layouts and means for providing a preview of each generated portion of the media project for evaluation by the user of the client device.

The above example system may further include means for receiving user input data and rearranging the layout of the generated portion based, at least in part, on the user input data.

The above system method may be further configured, alone or in combination with the above further configurations, wherein the identifying a set of one or more media elements associated with each user-selected media element includes means for comparing attributes of one or more media elements from the media database with attributes of each user-selected media element and identifying media elements associated with each user-selected media element based on the comparisons.

The above example system may further include, alone or in combination with the above further configurations, means for analyzing each set of identified associated media elements for each user-selected media element, means for identifying duplicate media elements included in more than one set of identified associated media elements and means for incorporating any identified duplicate media element in only one of the portions of the media project.

The above example system may further include, alone or in combination with the above further configurations, means for analyzing each set of identified associated media elements for each user-selected media element and means for establishing a subset of associated media elements having a low inter-correlation with one another.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. One or more non-transitory computer-readable memories storing instructions which, when executed by one or more processors, cause the machine to perform operations for creating a media project, said operations comprising:
   receiving a request to create a media project based on media stored within a media database, said media project comprising a first and at least a second portion;
   receiving a first and at least a second user-selected media element from said media database, wherein said first and said at least said second user-selected media elements are associated only with said first and said at least said second portion, respectively, of said media project;
   identifying one or more attributes associated with each of said first and said at least said second user-selected media elements;
   searching said media database and identifying a first and at least a second set of one or more media elements associated with each of said first and said at least said second user-selected media elements based, at least in part, on one or more attributes of each of said first and said at least said second user-selected media elements;
   identifying duplicate media elements included in more than one set of identified associated media elements corresponding to said first and said at least said second portions of said media project;
   incorporating any identified duplicate media element in only one of said first and said at least said second portions of said media project;
   generating said first and said at least said second portions of said media project corresponding to each user-selected media element and one or more media elements from said first and said at least said second sets of identified associated media elements arranged in an associated one of a plurality of layouts; and
   providing a preview of each generated portion of said media project for evaluation by said user.

2. The computer accessible medium of claim 1, further comprising receiving user input data and rearranging said layout of said generated portion based, at least in part, on said user input data.

3. The computer accessible medium of claim 1, wherein said identifying a set of one or more media elements associated with each user-selected media element comprises:
   comparing attributes of one or more media elements from said media database with attributes of each user-selected media element; and
   identifying media elements associated with each user-selected media element based on said comparisons.

4. The computer accessible medium of claim 1, further comprising:
   analyzing each set of identified associated media elements for each user-selected media element; and
   establishing a subset of associated media elements having a low inter-correlation with one another.

5. A method for creating a media project, said method comprising:
   receiving a request from a user of a client device to create a media project based on media stored within a media database, said media project comprising a first and at least a second portion;
   receiving one or more user-selected media elements from said media database, wherein said first and said at least said second user-selected media elements are associated only with said first and said at least said second portion, respectively, of said media project;
   identifying one or more attributes associated with each of said first and said at least said second user-selected media elements;
   searching said media database and identifying a first and at least a second set of one or more media elements associated with each of said first and said at least said second user-selected media element based, at least in part, on one or more attributes of each of said first and said at least said second user-selected media elements;
   identifying duplicate media elements included in more than one set of identified associated media elements corresponding to said first and said at least said second portions of said media project;
   incorporating any identified duplicate media element in only one of said first and said at least said second portions of said media project;
   generating said first and said at least said second portions of said media project corresponding to each user-selected media element and one or more media elements from said first and said at least said second sets of identified associated media elements arranged in an associated one of a plurality of layouts; and
   providing a preview of each generated portion of said media project for evaluation by said user of said client device.

6. The method of claim 5, further comprising receiving user input data and rearranging said layout of said generated portion based, at least in part, on said user input data.

7. The method of claim 5, wherein said identifying a set of one or more media elements associated with each user-selected media element comprises:
   comparing attributes of one or more media elements from said media database with attributes of each user-selected media element; and
   identifying media elements associated with each user-selected media element based on said comparisons.

8. The method of claim 5, further comprising:
   analyzing each set of identified associated media elements for each user-selected media element; and
   establishing a subset of associated media elements having a low inter-correlation with one another.

* * * * *